(12) United States Patent
Webster et al.

(10) Patent No.: US 6,948,733 B2
(45) Date of Patent: Sep. 27, 2005

(54) TRAILER HITCH GUIDE

(75) Inventors: Kara Webster, Sandy, UT (US); Roger Seiver, Pikeville, TN (US); John Hawkins, Draper, UT (US)

(73) Assignee: Dark Horse Enterprises, Inc., Sandy, UT (US)

( * ) Notice: Subject to any disclaimer, the term of this patent is extended or adjusted under 35 U.S.C. 154(b) by 50 days.

(21) Appl. No.: 10/667,143

(22) Filed: Sep. 19, 2003

(65) Prior Publication Data

US 2004/0207176 A1 Oct. 21, 2004

(Under 37 CFR 1.47)

Related U.S. Application Data

(60) Provisional application No. 60/464,592, filed on Apr. 21, 2003.

(51) Int. Cl.[7] .................................................. B60D 1/00
(52) U.S. Cl. ........................................................ 280/477
(58) Field of Search ................................ 280/477, 511

(56) References Cited

U.S. PATENT DOCUMENTS

| | | | | |
|---|---|---|---|---|
| 3,765,703 A | * | 10/1973 | Voelkerding et al. | 280/477 |
| 3,773,356 A | * | 11/1973 | Eichels et al. | 280/477 |
| 3,879,062 A | * | 4/1975 | Miller | 280/477 |
| 4,226,438 A | * | 10/1980 | Collins | 280/477 |
| 4,840,392 A | * | 6/1989 | Baskett | 280/477 |
| 4,844,496 A | * | 7/1989 | Webb et al. | 280/477 |
| 4,871,184 A | * | 10/1989 | Johnson | 280/477 |
| 4,871,185 A | * | 10/1989 | Chakroff et al. | 280/477 |
| 5,080,386 A | * | 1/1992 | Lazar | 280/477 |
| 5,533,743 A | * | 7/1996 | Bello | 280/507 |
| 5,725,232 A | * | 3/1998 | Fleming | 280/477 |
| 6,039,339 A | * | 3/2000 | Bello | 280/507 |
| 6,234,510 B1 | * | 5/2001 | Hammons | 280/477 |
| 6,322,094 B1 | * | 11/2001 | Poe | 280/507 |

* cited by examiner

Primary Examiner—Lesley D. Morris
Assistant Examiner—Paul Royal, Jr.
(74) Attorney, Agent, or Firm—Bateman IP Law Group

(57) ABSTRACT

A trailer hitch alignment device facilitates the alignment of the trailer tongue with the drop hitch ball of the towing vehicle. The device includes a vertical back plate, curved in the middle to create an obtuse angle to partially surround a drop hitch ball in order to guide the tongue of a trailer toward the ball hitch. A horizontal base plate is attached at a 90 degree angle at a height above the bottom edge of the vertical back plate. An aperture in the horizontal base plate allows for the emerging ball of the hitch. The invention is held in proper orientation by a snug, tight fit between the hitch post and base plate and/or back plate to prevent displacement during use of the invention.

16 Claims, 5 Drawing Sheets

TRAILER HITCH GUIDE

RELATED APPLICATION

This application claims the benefit of U.S. Provisional Patent Application Ser. No. 60/464,592, filed Apr. 21, 2003.

BACKGROUND OF THE INVENTION

1. Field of the Invention

The present invention relates to a device for use when attaching trailer hitches. More particularly, the present invention relates to a trailer hitch guide which assists a driver of a vehicle to properly couple the ball hitch on the towing vehicle with the trailer tongue on the trailer to be pulled.

2. State of the Art

The process of aligning the ball hitch of a towing vehicle with the trailer tongue can be a frustrating experience. A relatively small trailer tongue must be aligned with an equally small ball hitch. Furthermore, all of this must be done in a location which cannot readily be seen by the driver of the towing vehicle. Once the towing vehicle and the trailer are close to each other, the critical distance of a few inches forward, backward or to either side means the difference between coupling the two devices, or causing contact between the trailer tongue and the back of the towing vehicle.

With today's common use of SUV's (sport utility vehicles), collision with the trailer tongue and the SUV back gate can be especially costly. Besides the possible damage to the towing vehicle, without the assistance of a trailer guide hitch mechanism the process of trying to realign the towing vehicle and the trailer requires many trials and errors, or a second party.

Because a second person is not always available, a trailer hitch guide mechanism can provide needed assistance. Such guides can save driver frustration and prevent a simple error of overestimating the distance between the towing vehicle and trailer tongue from causing costly damage.

To help facilitate the hitching process, many devices have been developed to help guide the trailer tongue into the proper position for engaging the tow vehicle. Such devises include U.S. Pat. No. 6,273,448; U.S. Pat. No. 6,209,902; U.S. Pat. No. 6,042,136; and U.S. Pat. No. 6,585,281. Many hitch guides, however, do not accommodate the configuration of drop hitches or are otherwise deficient.

While the above mentioned trailer alignment devices fulfill their respective, particular objectives and requirements, they have been used primarily with bumper hitches that do not accommodate the configuration of drop hitches. Moreover, current alignment devices are loosely secured to the trailer and the drop hitch, allowing the alignment device to be knocked out of position if it is jarred or bumped. Because the trailer typically has considerable weight, even backing the guide into the trailer tongue can cause the guide to be knocked out of place. Additionally, many of the existing alignment devices are configured in such a way that they have to be removed or are cumbersome while the towing vehicle is in motion.

The present invention departs from conventional concepts and designs of the prior art by providing an apparatus developed to facilitate the alignment of the towing vehicle's drop hitch ball with the trailer tongue, even if the towing vehicle does not move into exactly the right spot. The present invention also departs from the prior art in that it attaches very securely to the drop hitch and will not be displaced when bumped during the alignment process. The invention is installed and removed easily to allow use with more than one towing vehicle if so desired. Manufacturing and materials are inexpensive, resulting in an affordable solution to the driver's frustration and the possible damage to the towing vehicle. The invention is constructed to achieve durability to last through many years of use. An alternate design of the invention is fitted with a plastic covering to protect the metal surface of the invention from scratches and small dents. Furthermore, the present invention does not need to be removed during normal, everyday operation of the towing vehicle.

SUMMARY OF THE INVENTION

It is an object of the invention to provide an alignment device for the purpose of aligning the trailer tongue with the drop hitch ball on the towing vehicle.

It is another object of the invention to provide an alignment device that will not be moved easily if it is jarred or rammed by the trailer tongue during the hitching operation.

The above and other objects of the invention are accomplished by the use of a trailer hitch guide which has a back plate and a base plate. In accordance with one aspect of the invention, either the back plate or the base plate is configured to engage the hitch post to thereby prevent rotation of the guide upon impact with the trailer tongue.

In accordance with one aspect of the invention, the back plate extends downwardly beyond the base plate so as to engage the hitch post and minimize pivoting of the guide when the guide engages the trailer tongue. The base plate is at such a height to ensure tight contact between the base plate and the ball of the hitch.

In accordance with another aspect of the invention, the base plate is contoured to engage the hitch post and thereby minimize movement of the guide when the guide is engaged by the trailer tongue. Preferably, the base plate has a squared channel formed therein for receiving the top of the hitch post.

In accordance with another aspect of the invention, the guide may be provided with an aperture through which the stud of the hitch ball is mounted or provided with a cutout channel to allow the guide to be slid under the ball of the hitch.

In accordance with still yet another aspect of the invention, the guide is covered with a plastic covering to protect the metal surface of the guide from scratches and small dents and preserve the aesthetics of the guide. To hold the covering in place, the covering is molded to form a tight fit with the invention or attachments are used, or to otherwise engage the hitch guide.

BRIEF DESCRIPTION OF THE DRAWINGS

The above and other objects, features and advantages of the invention will become apparent after a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims. Furthermore, it should be appreciated that the components of the individual embodiments discussed may be selectively combined in accordance with the teachings of the present disclosure.

Figure 1:
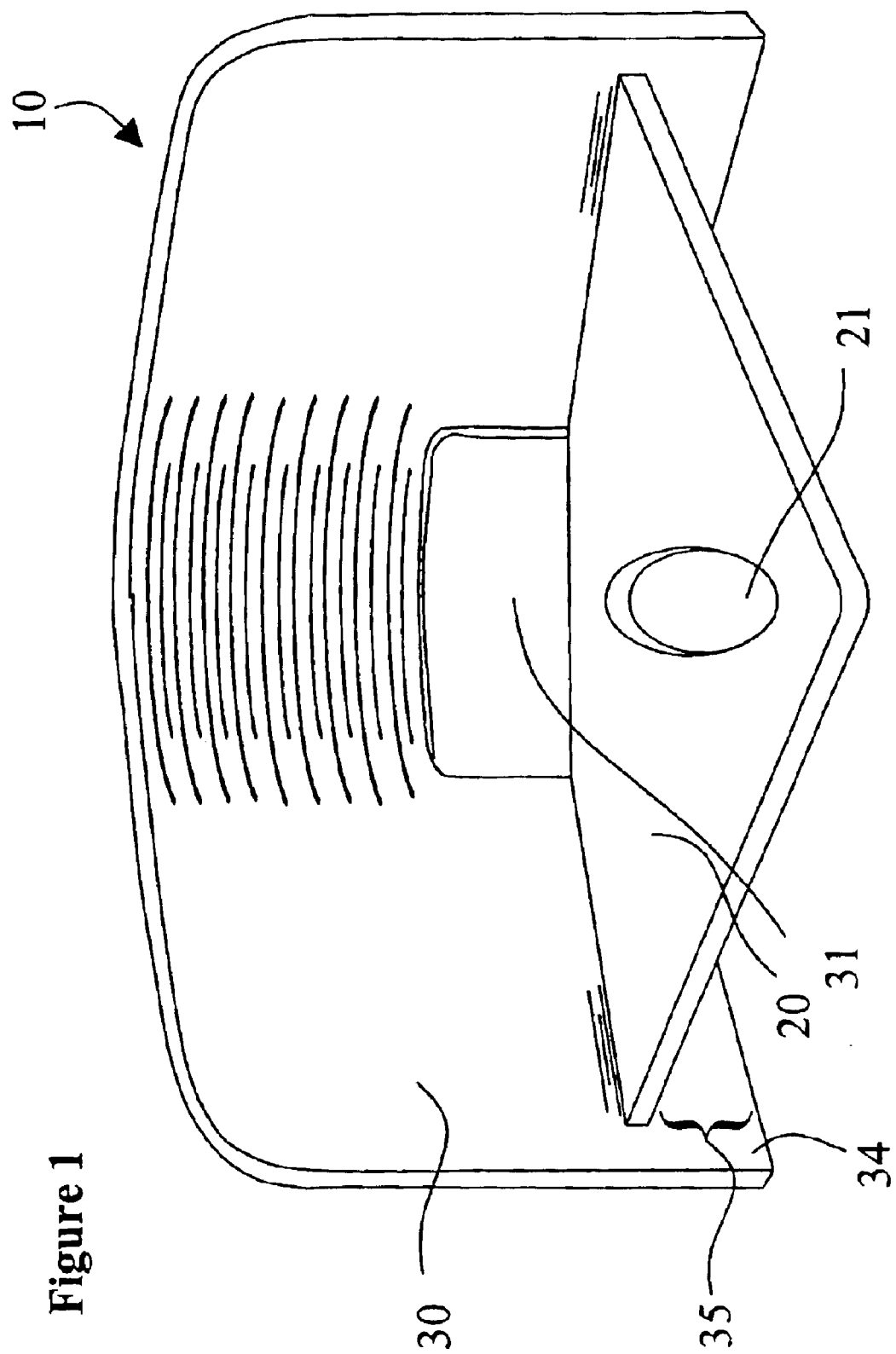
FIG. 1 is a perspective view of a guide made in accordance with the principles of the present invention.

Referring to FIG. 1, depicted is a hitch guide, generally indicated at 10, which includes generally, a horizontal base plate 20, and generally a vertical back plate 30. The base plate 20 is welded a short distance from the bottom edge of the back plate 30 at approximately a 90 degree angle. The back plate 30 is preferably curved in the middle, having sides flared outward to create an obtuse angle, thus configured to partially surround a drop hitch ball in order to guide the trailer tongue toward the ball hitch. A cutout 31 in the back plate 30 is designed to receive the end of the trailer tongue and the elbow of the drop hitch if necessary. As the towing vehicle is backed up to the trailer tongue, the trailer tongue will contact the hitch guide 10, and due to the curved design of the back plate 30 will be directed toward the center of the invention, above the ball hitch.

The base plate 20 includes an aperture 21 through which the guide 10 is secured to the hitch post of a towing vehicle using a ball stud and nut. The base plate 20 is preferably welded or otherwise attached to the back plate 30 so as to leave a flange 34 resulting in an overhang, shown at 35. When the hitch guide 10 is placed on the hitch post so that the hitch post slides into the channel 31, the overhang 35 which extends down on either side of the hitch post minimizes side to side movement or rotational movement of the hitch guide 10 when the trailer tongue engages the guide. In other words, the flange 35 of the back plate 30 engages a hitch post (not shown) and prevents the force of the tongue of a trailer from simply rotating the hitch guide 10 as the towing vehicle backs up.

Figure 2A:
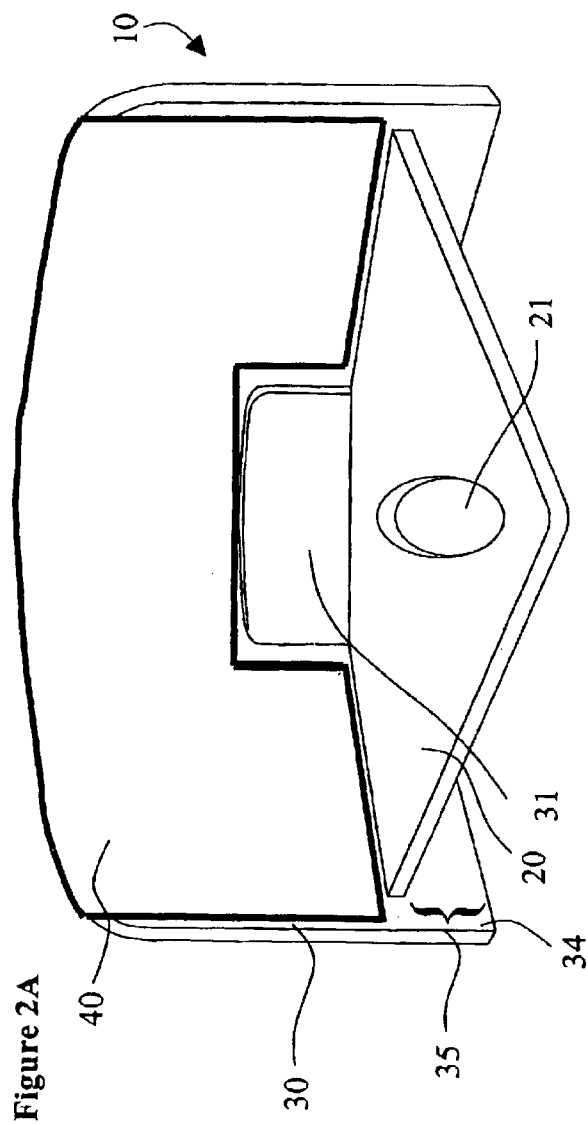
FIG. 2A is a front view, similar to that of FIG. 1, but showing the addition of the protective plastic covering in accordance with another aspect of the present invention.

FIG. 2A is similar to FIG. 1, except for the addition of a plastic protective covering 40. The covering 40 is preferably secured by a snug, tight fit with the curved vertical back plate. This can be accomplished by making a pocket in the covering which is substantially the same size as the top portion of the backing plate 30 so that there is a friction fit. In the alternative, the covering 40 could be biased slightly so that is presses against the backing plate 30 and thereby holds itself on.

Figure 2B:
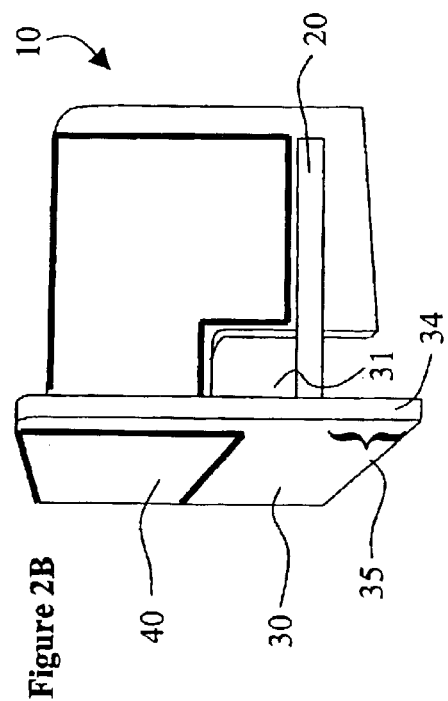
FIG. 2B is a side view of the embodiment shown in FIG. 2A rotated 90 degrees counterclockwise.

The plastic covering serves to protect the metal surface of the invention from scratches and small dents, and to protect similar damage to the trailer tongue. FIG. 2B shows a side view of the embodiment in FIG. 2A, and how the plastic covering hangs over the backside of the invention to make a tight fit. Those skilled in the art will appreciate that other attachment methods could be used.

Figure 3:
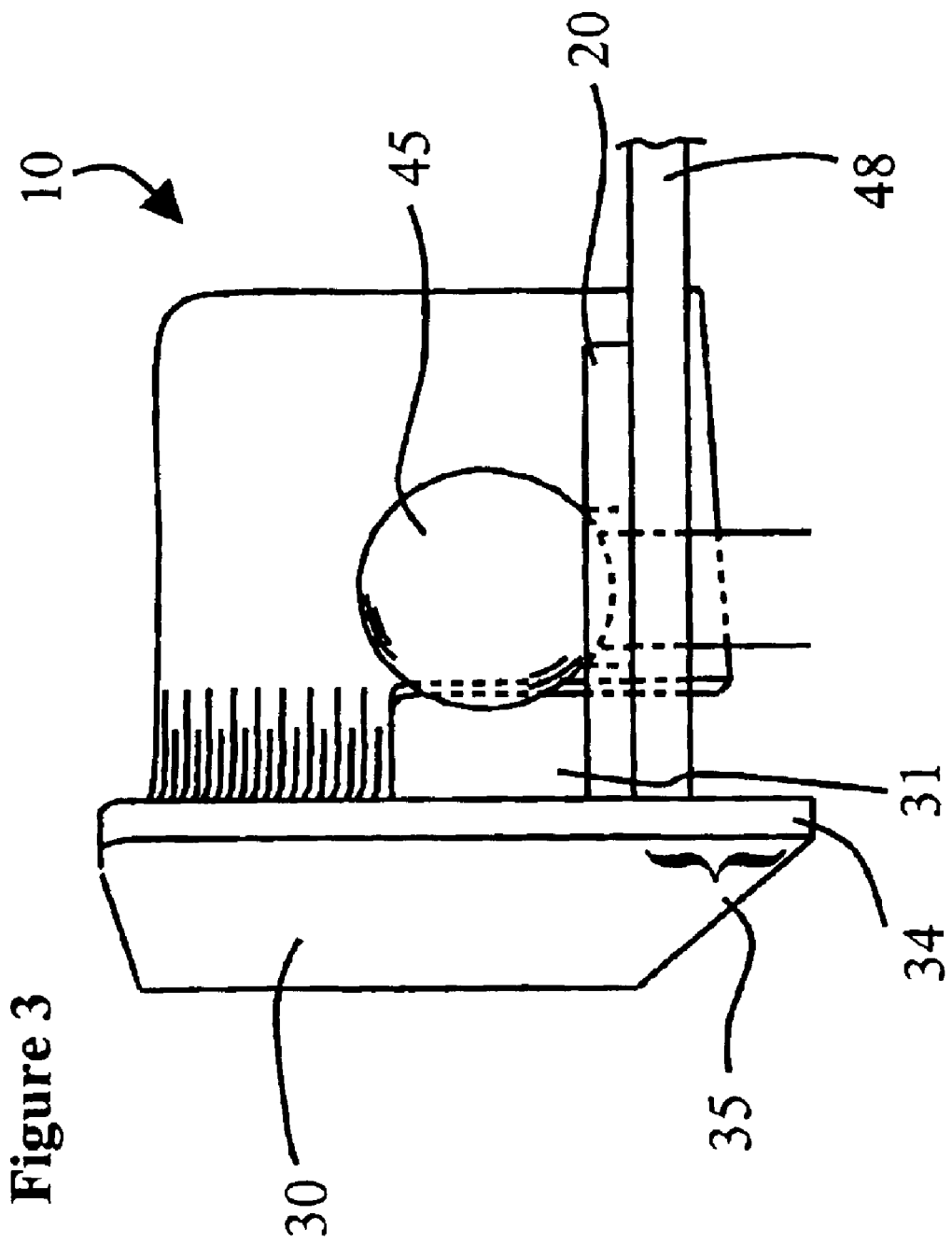
FIG. 3 is a side view of the embodiment of FIG. 1 rotated 90 degrees counterclockwise, and mounted on a trailer hitch.

FIG. 3 illustrates how the guide 10 will be placed with respect to the ball hitch 45 of the towing vehicle. The base plate 20 is attached to the back plate 30 at such a height, shown at 35, to provide close contact to the ball of the hitch 45. As shown in FIG. 3, the ball of the hitch 45, the base plate 20, and the hitch post 48 are in close contact. As a trailer tongue impacts the back plate 30, it will be directed toward the center, i.e. over the ball 45. Because the back plate 30 engages the hitch post 48, the back plate will not rotate, but will force the trailer tongue in the desired direction.

Figure 4:
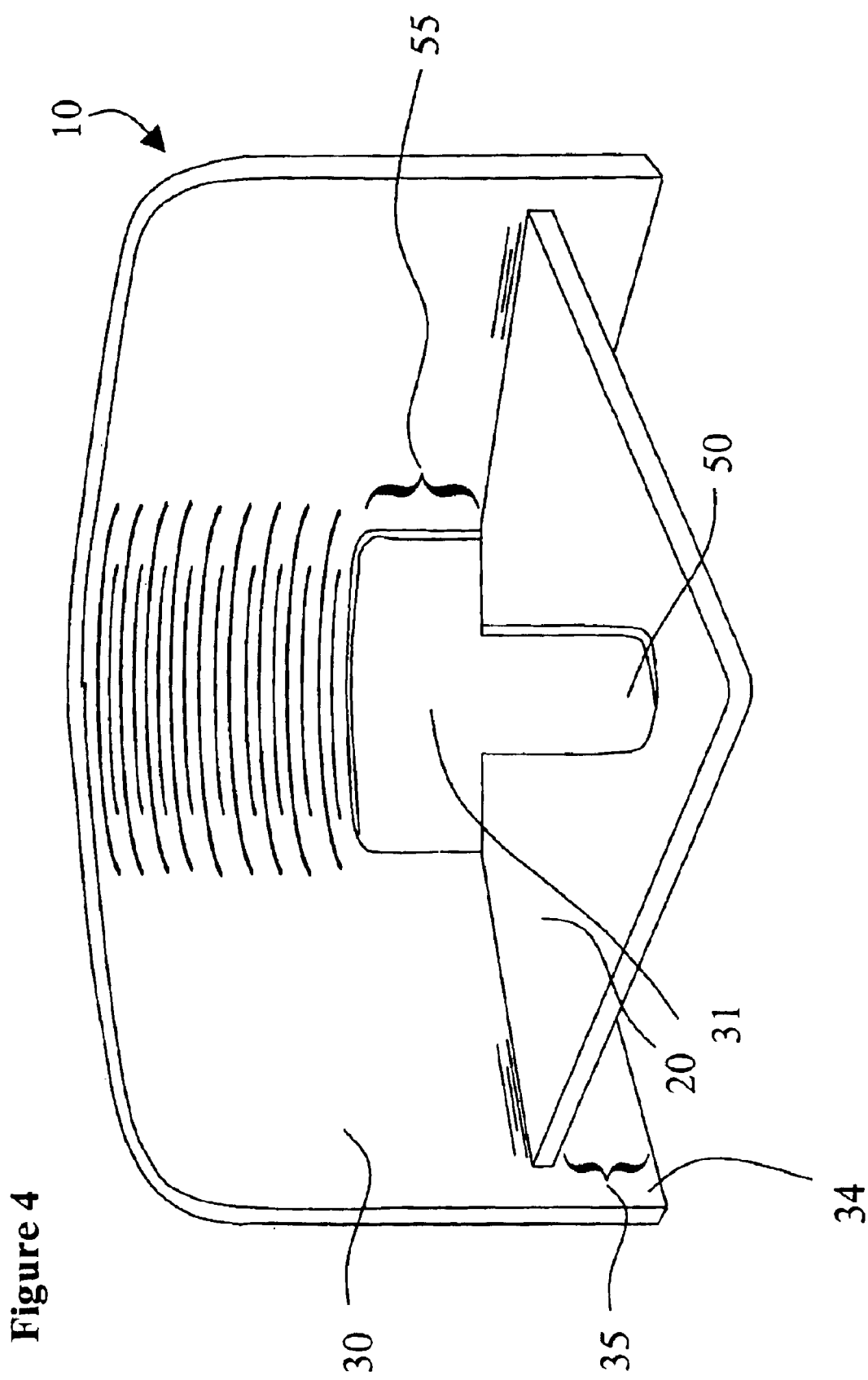
FIG. 4 is a perspective view of an alternate embodiment of the guide with a cutout channel for receiving the trailer hitch.

FIG. 4 shows another alternate embodiment of a hitch guide, generally indicated at 10, made in accordance with the principles of the present invention. FIG. 4 is similar to FIG. 1, except that the oval aperture of FIG. 1 is replaced with a channel cutout 50. This cutout 50 allows for the invention to be slid under the ball hitch. This design eliminates the step of removing the ball of the hitch during installation. The height of the cutout 31 in the back plate 30, as shown at 55, is at a height greater than the height of the ball hitch, to facilitate installation.

Figure 5:
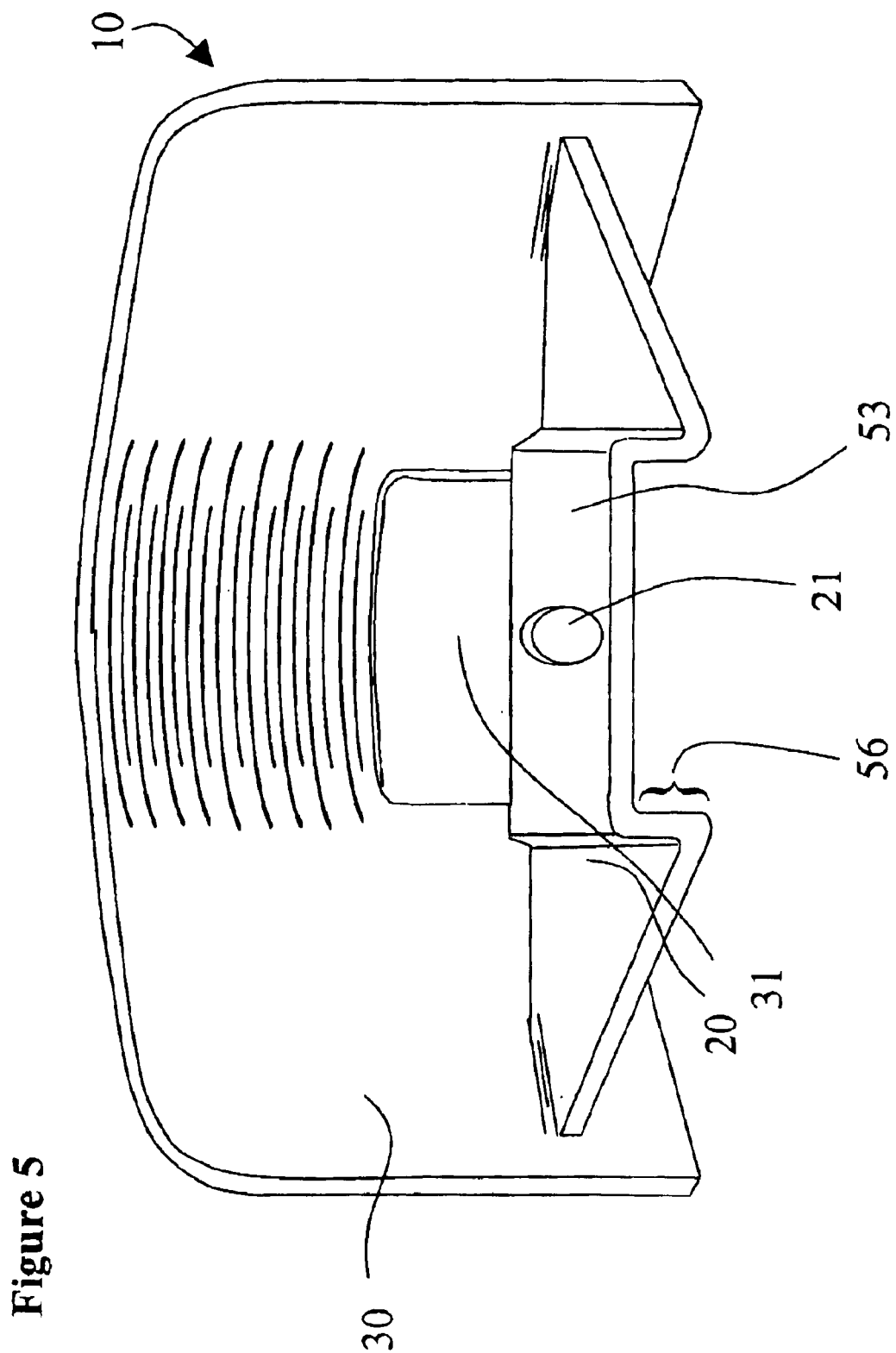
FIG. 5 is a view of an alternate embodiment of the invention wherein the base plate is contoured to receive the hitch post of a trailer hitch.

FIG. 5 shows an alternate design of the hitch guide 10. Instead of a flat base plate 20 with flanges on the back plate, a step 53 in the center of the base plate 20 is formed so as to receive the hitch post so that the hitch post is nested therein. Because the step 53 is of a sufficient height 56, the base plate extends downwardly on either side of the hitch post and prevents the base plate 20, and thus the entire hitch guide 10, from rotating when the hitch guide is impacted by the trailer tongue. Preferably, this height is between ¼ and ¾ inches and most preferably about ½ inch.

Thus disclosed is a trailer hitch alignment system which facilitates the alignment of a trailer with the drop hitch ball of the towing vehicle. Those skilled in the art will appreciate numerous modifications which can be made without departing from the scope and spirit of the present invention. The appended claims are intended to cover such modifications.

What is claimed is:

1. An alignment device to guide the tongue of a trailer toward the hitch ball of a tow vehicle comprising:
   a generally horizontal base plate, the base plate comprising a generally flat piece of metal having a hole therein for receiving a hitch ball on a trailer hitch post; and
   a generally vertical back plate, the back plate being formed from a single continuous piece of metal which is bent into a V or U shape, the bottom edge of the back plate being attached to the base plate such that the bottom edge of the back plate extends donwardly past the base plate so as to engage a trailer hitch post and thereby inhibit rotation of the base plate.

2. The alignment guide of claim 1, wherein the back plate further comprises a generally rectangular opening formed in the bottom of the back plate, the opening being configured for engaging the hitch post of a vehicle to thereby prevent rotation of the alignment device.

3. The alignment guide of claim 1, wherein the rectangular opening in the back plate extends above the base plate.

4. The alignment guide of claim 1, further comprising a cutout in the base plate or back plate configured to receive a hitch post.

5. The alignment device of claim 1, wherein the bottom edge of the back plate extends at least ½ inch below the base plate.

6. The alignment device of claim 1, wherein the back plate is curved so as to partially surround a drop hitch ball and thereby to guide the tongue of a trailer or towed vehicle toward the ball hitch.

7. The alignment device of claim 1, further comprising a plastic covering disposed on the alignment device to inhibit damage to the device.

8. A single piece alignment device to guide the tongue of a trailer toward the hitch ball of a tow vehicle comprising:

a generally horizontal base plate formed from a single continuous piece of metal and having a hole therein for receiving a hitch ball;

a generally vertical back plate formed from a single continuous piece of metal and bent into a V or U shape, the back plate being permanently attached to the base plate; and an opening disposed in the back plate configured for at least partially receiving a hitch post and thereby inhibiting rotation of the alignment device on the hitch post.

9. The alignment guide of claim 8, further comprising a covering to protect the back plate from scratches and small dents.

10. The alignment guide of claim 9, wherein the covering is constructed out of plastic which is molded to correspond to the shape of the back plate.

11. The alignment guide of claim 8, wherein the opening extends below the base plate.

12. The alignment device of claim 8, wherein the base plate has a cutout configured for sliding the base plate under a ball of a ball hitch so as to mount the alignment device without complete removal of the ball hitch.

13. An alignment device to guide the tongue of at trailer toward the hitch ball of a tow vehicle comprising:

a base plate formed from a piece of metal, the base plate having a front edge and a back edge, wherein the base plate is bent so as to form a channel in the base plate extending from the front edge to the back edge, the channel being configured for receiving the hitch post of a vehicle, and wherein an opening is formed along the channel for receiving a hitch ball; and a generally vertical back plate formed from plate steel and bent into a V or U shape, the back plate being attached to the back edge of the base plate so as to extend vertically from the base plate.

14. The alignment device of claim 13, wherein the channel extends upwardly into the base plate between ¼ and ¾ of an inch.

15. The alignment device of claim 13, wherein the device further comprises an opening in the back plate.

16. The alignment device of claim 13, wherein the device further comprises a covering to protect the device from damage.

* * * * *